United States Patent [19]
Alario et al.

[11] Patent Number: 5,968,345
[45] Date of Patent: Oct. 19, 1999

[54] PROCESS FOR THE CATALYTIC CONVERSION OF HYDROCARBONS INTO AROMATIC COMPOUNDS USING A CATALYST CONTAINING ALKALI OF ALKALINE-EARTH METALS

[75] Inventors: Fabio Alario, Neuilly-S/Seine; Jean-Marie Deves, Vernouillet; Patrick Euzen, Paris, all of France

[73] Assignee: Institut Francais du Petrole, Rueil Malmaison, France

[21] Appl. No.: 08/973,406

[22] PCT Filed: Jun. 14, 1996

[86] PCT No.: PCT/FR96/00915

§ 371 Date: Dec. 15, 1997

§ 102(e) Date: Dec. 15, 1997

[87] PCT Pub. No.: WO97/00303

PCT Pub. Date: Jan. 3, 1997

[30] Foreign Application Priority Data

Jun. 16, 1995 [FR] France ................................. 95 07193

[51] Int. Cl.⁶ .................................................. C10G 35/085
[52] U.S. Cl. .......................... 208/139; 208/134; 208/135; 208/136; 208/137; 208/138; 585/418; 585/419; 585/420; 585/421
[58] Field of Search ..................................... 208/134, 135, 208/136, 137, 138, 139; 585/418, 419, 420, 421

[56] References Cited

U.S. PATENT DOCUMENTS

| | | | |
|---|---|---|---|
| 3,177,136 | 4/1965 | Lang et al. ............................. | 208/139 |
| 3,772,184 | 11/1973 | Bertolacini et al. ...................... | 208/65 |
| 4,012,313 | 3/1977 | Buss et al. ............................. | 208/139 |
| 4,083,883 | 4/1978 | Hayes ................................... | 585/434 |
| 4,191,637 | 3/1980 | Light et al. ............................. | 208/139 |
| 4,193,895 | 3/1980 | Light et al. ............................. | 502/230 |
| 4,329,258 | 5/1982 | Engelhard et al. ..................... | 502/226 |
| 4,363,721 | 12/1982 | Engelhard et al. ..................... | 208/139 |
| 4,430,517 | 2/1984 | Imai et al. ............................. | 585/660 |
| 4,487,848 | 12/1984 | Robinson et al. ....................... | 502/223 |
| 4,522,935 | 6/1985 | Robinson et al. ....................... | 502/223 |
| 4,529,505 | 7/1985 | Robinson et al. ....................... | 208/139 |
| 4,914,074 | 4/1990 | McNiff .................................. | 502/226 |
| 4,963,249 | 10/1990 | Baird, Jr. et al. ....................... | 208/139 |
| 4,964,975 | 10/1990 | Chao et al. ............................. | 208/139 |
| 4,966,682 | 10/1990 | Baird, Jr. et al. ....................... | 208/139 |
| 4,966,878 | 10/1990 | Baird, Jr. ............................... | 502/226 |
| 4,966,879 | 10/1990 | Baird, Jr. ............................... | 502/226 |
| 4,966,880 | 10/1990 | Baird, Jr. et al. ....................... | 502/242 |
| 4,966,881 | 10/1990 | Baird, Jr. ............................... | 502/252 |
| 5,166,121 | 11/1992 | Khare et al. ............................ | 502/225 |
| 5,298,154 | 3/1994 | Khare et al. ............................ | 208/139 |
| 5,665,223 | 9/1997 | Bogdan ................................. | 208/138 |

FOREIGN PATENT DOCUMENTS

| | | |
|---|---|---|
| 0020240 | 12/1980 | European Pat. Off. . |
| 0034228 | 8/1981 | European Pat. Off. . |
| 0068708 | 1/1983 | European Pat. Off. . |
| 0317103 | 5/1989 | European Pat. Off. . |
| 0407117 | 1/1991 | European Pat. Off. . |
| 0623384 | 11/1994 | European Pat. Off. . |

*Primary Examiner*—Walter D. Griffin
*Attorney, Agent, or Firm*—Oblon, Spivak, McClelland, Maier & Neustadt, P.C.

[57] ABSTRACT

A process for the conversion of a hydrocarbon load containing paraffin, naphthene and aromatic hydrocarbons having 5 to 12 carbon atoms into aromatic compounds, which entails contacting the load with a catalyst under temperature and pressure conditions to produce the aromatic compounds, the catalyst containing:

- a matrix consisting of 0 to 100% by weight of η transition alumina, the remaining weight percentage of the matrix, up to 100%, consisting of γ transition alumina, and
- at least one doping metal selected from the group consisting of alkali metals and alkaline-earth metals,
- at least one halogen selected from the group consisting of fluorine, chlorine, bromine and iodine,
- at least one noble metal selected from the platinum group, and
- at least one promoter metal selected from the group consisting of tin, germanium, indium, thallium, antimony, lead, rhenium, manganese chromium, molybdenum and tungsten,
- the catalyst having previously been hydrothermally treated at a temperature of 300 to 1,000° C. in a gaseous atmosphere containing steam, the atmosphere also containing chlorine in a molar content of greater than 0 but no more than 20%.

21 Claims, No Drawings

PROCESS FOR THE CATALYTIC CONVERSION OF HYDROCARBONS INTO AROMATIC COMPOUNDS USING A CATALYST CONTAINING ALKALI OF ALKALINE-EARTH METALS

BACKGROUND OF THE INVENTION

1. Field of the Invention

The present invention relates to a process for the catalytic conversion of hydrocarbons into aromatic compounds to be used for the reforming of gasolines and the production of aromatics.

In more precise manner, it relates to a process of this type using as catalyst a catalyst which comprises a matrix consisting of η transition alumina or γ transition alumina, or a mixture of these two aluminas, at least one doping metal chosen from the group made up of alkali and alkaline-earth metals, at least one halogen, at least one noble metal and at least one promoter metal.

2. Description of the Background

Catalyst reforming is a process which can be used to obtain improved octane ratings of petroleum fractions, in particular of heavy distillation gasoline by conversion of n-paraffins and naphthenes into aromatic hydrocarbons.

Catalyst reforming therefore entails the conversion firstly of $C_7$–$C_{10}$ n-paraffins into aromatics and light paraffins, and secondly of $C_7$–$C_{10}$ naphthenes into aromatics and light paraffins. These reactions are illustrated in particular by the conversion through dehydrogenation of cyclohexanes and dehydroisomerization of alkyl cyclopentanes to give aromatics, for example methyl cyclohexane giving toluene, and by the conversion through cyclization of n-paraffins into aromatics, for example n-heptane giving toluene.

During catalytic reforming, cracking reactions of heavy n-paraffins into light paraffins also take place, leading in particular to C1–C4 products, chiefly propane and isobutane: these reactions are detrimental to the yield of reformed product.

Finally, coke formation also takes place through condensation of aromatic nuclei to form a solid product rich in carbon which is deposited on the catalyst.

These reforming catalysts are extremely sensitive, in addition to coke, to various poisons likely to deteriorate their activity: in particular sulphur, nitrogen, metals and water.

When coke is deposited on the surface of the catalyst it leads to loss of activity in the course of time which gives rise to higher operating temperatures, a lower yield of reformed product and a higher yield of gas.

On this account, and taking into consideration the regeneration of the catalyst, the process of catalytic reforming can be implemented in two different manners: in semi-regenerative or cyclical manner and in continuous manner. In the former, the process is carried out in a fixed bed, and in the latter in a mobile bed.

In the semi-regenerative process, to offset the loss of activity of the catalyst, the temperature is gradually increased then the installation is stopped to proceed with regenerating the catalyst by eliminating the coke. In cyclical reforming which is in fact a variant of the semi-regenerative process, the installation comprises several reactors in series and each is put out of operation in turn, the coke deposits are eliminated from the catalyst placed out of circuit and the catalyst is regenerated while the other reactors remain in operation.

In continuous reforming, the reactors used are mobile bed reactors operating at low pressure (less than 15 bars), which allows for considerably improved yields of reformed product and hydrogen by promoting aromatization reactions to the detriment of cracking reactions, coke formation on the other hand being greatly accelerated. The catalyst passes through the reactors, then through a regenerating section.

On account of the chemical reactions that take place during reforming processes, a bifunctional catalyst must be used which combines two types of activity namely the hydrogenating-dehydrogenating activity of a metal, in particular a noble metal such as platinum, possibly in conjunction with other metals such as rhenium or tin, so-called promoter metals, this metal being deposited on the surface of a porous matrix. This matrix of alumina contains a halogen, preferably a chloride, which provides the necessary acidic function for isomerizations, cyclizations and cracking reactions.

The matrices generally used are chosen from among the refractory oxides of the metals of groups II, II and IV of the periodic table of elements. Aluminium oxide with the general formula $Al_2O_3.n_2O$ is most frequently used. Its specific surface area lies between 150 and 400 $m^2/g$. This oxide in which n lies between 0 and 0.6 is conventionally obtained by controlled dehydration of hydroxides in which $1 \leq n \leq 3$. These amorphous hydroxides are themselves prepared by precipitation of aluminium salts in an aqueous medium by alkali salts. Precipitation and maturing conditions determine several forms of hydroxides, the most common being boehmite (n=1), gibbsite and bayerite (n=3). Depending upon hydrothermal treatment conditions, these hydroxides give several oxides or transition aluminas. Their forms are ρ, γ, η, χ, θ, δ, κ and α which distinguish themselves chiefly through the organization of their crystalline structure. During heat treatments, these different forms are likely to inter-evolve in accordance with a complex filiation system which is dependent upon operating conditions. The α form, which has a specific surface area and acidity in the region of zero, is the most stable at high temperatures. For catalysts, in particular for reforming catalysts, the γ form of transition alumina is the form most often used as it offers a compromise between its acid properties and thermal stability.

As indicated above, the hydrogenation-dehydrogenation function is preferably provided by a noble metal from group VIII in the periodic table.

Numerous studies have especially examined the dehydrogenating function of these catalysts, and more specifically the type and method of introduction of the promoter metal added to the platinum. The chief effect of this second metal is to promote the dehydrogenating activity of platinum. In some cases, this second metal or promoter also produces the effect of limiting the dispersion loss of platinum atoms on the surface of the support. This dispersion loss is partly responsible for deactivation of the catalyst.

Among all the promoter metals examined, two metals hold a preponderant place rhenium and tin. It is these two metals which probably obtain the best promotion effects of platinum.

Therefore, the use of rhenium has in particular contributed to increasing the stability of the catalyst vis-a-vis its deactivation through the depositing of coke. This type of catalyst is most often used in fixed bed units. With this increase in stability, it has also been possible to increase the duration of the reaction cycles between two regenerations.

With tin, it has been possible to improve the performance of these catalysts when they are used at low pressure. This improvement in conjunction with their lower cracking activity has led to obtaining improved yields of reformed product especially in continuous regeneration processes operating at low pressure. Catalysts of this type containing rhenium, tin or even lead have been described in particular in U.S. Pat. No. 3,700,588 and U.S. Pat. No. 3,415,737.

For the conversion of hydrocarbons, a catalyst must offer a maximum level of activity but, in addition, must activate this conversion with the greatest possible selectivity. In particular, losses of hydrocarbons in the form of light products containing 1 to 4 atoms of carbon must be limited. The acid function is necessary for reactions producing aromatics and improving octane ratings. Unfortunately, this function is also responsible for cracking reactions which lead to the formation of light products. In consequence, it is evident that optimization of the quality of this acid function is of importance in order to further improve selectivity without however reducing the activity of the catalyst.

Catalysts must also be made more stable, that is to say resistant to coke poisoning.

Also, it has been seen that catalysts are used either in fixed bed processes or in mobile bed processes. In the latter, the catalysts undergo a high number of regenerations. These treatments whose action includes, amongst others, burning the coke deposited on the catalyst, are carried out at high temperatures in the presence of steam. Unfortunately, these conditions contribute to deterioration of the catalyst. It is therefore important to seek to increase the resistance of catalysts under such conditions.

Also, these catalysts are in the form of extrudates or beads whose size is sufficient to give relatively easy passage to reagents and gas products. The wear of these catalysts, in particular through friction in the mobile bed units, causes the formation of dust and finer grains. These finer grains disturb gas outflow and necessitate an increase in the entry pressure of the reagents, and even, in some cases, require the operation of the unit to be stopped. Moreover, in mobile bed units, the consequence of this gradual wear is to disturb the circulation of the catalyst and require frequent topping up with new catalyst.

A catalyst such as a reforming catalyst must therefore meet a high number of requirements or which some may appear to be contradictory. This catalyst must firstly offer the highest possible activity with which high yields can be obtained, but this activity must be combined with the greatest possible selectivity, that is to say that cracking reactions producing light products containing 1 to 4 carbon atoms must be limited.

Also, the catalyst must offer great stability against its deactivation through coke deposit: the catalyst must also offer excellent resistance to deterioration when subjected to the extreme conditions prevailing in the repeated regeneration operations it must undergo.

In the continuous reforming process using mobile bed reactors, as mentioned above, the catalysts are also subjected to intense gradual wear through friction leading to a substantial reduction in their specific surface area and to the formation of "fines" which are detrimental to the proper functioning of the installation. The catalysts currently available, while they may meet one or more of these conditions, do not fulfill all the requirements mentioned above.

SUMMARY OF THE INVENTION

The object of the invention is therefore to provide a process for the conversion of hydrocarbons using a catalyst which offers all the properties set forth above, in particular improved catalytic performances, and also a longer life during reforming reactions and the production of aromatics.

These objects, and others, are achieved according to the present invention by a process for the conversion of hydrocarbons into aromatic compounds, which consists of placing a load of said hydrocarbons in contact with a catalyst under temperature and pressure conditions that are appropriate to said conversion, this process being characterized in that the catalyst comprises:

a matrix consisting of a 0 to 100% by weight of η transition alumina, the remaining weight percent up to 100% being provided by γ transition alumina, and at least one doping metal chosen from the group of alkali and alkaline-earth metals, at least one halogen chosen from the group consisting of fluorine, chlorine, bromine and iodine, at least one noble metal from the platinum group, and at least one promoter metal chosen from the group made up of tin, germanium, indium, gallium, thallium, antimony, lead, rhenium, manganese, chromium, molybdenum and tungsten; said catalyst having been subjected to additional hydrothermal treatment at a temperature of 300 to 1000° C. in a gas atmosphere containing steam.

DETAILED DESCRIPTION OF THE PREFERRED EMBODIMENTS

It is known that in the area of catalysts and in particular in the area of reforming catalysts, γ transition alumina is the form most frequently used (see above). According to the invention, the matrix of the catalyst may also, in surprising manner, consist of η transition alumina or of a mixture of η alumina and γ alumina.

According to the invention, when a mixture of γ transition alumina and η transition alumina is used, it may comprise from 0.1 to 99%, preferably from 1 to 84% by weight of η alumina. Further preferably this mixture contains from 3 to 70% by weight, or even better from 5 to 50% by weight of η transition alumina, the remaining weight percentage up to 100% of the mixture being provided by γ transition alumina.

η transition alumina is obtained by roasting bayerite under dry air at atmospheric pressure between 250 and 500° C., preferably between 300 and 450° C. The specific surface area attained which is related to the final roasting temperature, lies between 300 and 500 m$^2$/g. γ alumina is derived from boehmite through roasting under air at a temperature of between 450 and 600° C. The specific surface area of the γ alumina obtained lies between 100 and 300 m$^2$/g.

The structures of these aluminas are similar but can be differentiated by X-ray diffraction. These structures crystallize in the cubic system of spinel type. The crystalline parameter of the η form is a=7.90 A and c=7.79 A.

Prepared in this way the catalyst, in surprising manner, meets all the requirements set out above for a catalyst.

Firstly, the presence on the alumina matrix of at least one doping metal chosen from the group of alkali and alkaline-earth metals, produces the effect, in particular, of protecting the matrix of alumina or aluminas against loss of specific surface area during the different regeneration treatments to which the catalyst is subjected.

Secondly, hydrothermal treatment at high temperature in the presence of water plays an important role. In unexpected manner, this severe hydrothermal treatment, in the presence of water and possibly a halogen, applied to this type of catalyst containing at least one element from the group made up of alkali and alkaline-earth metals, produces the effect not only of maintaining the least loss of specific surface area, but also of improving significantly the catalytic performances during the process of the invention and in particular during reforming reactions and the production of aromatics, compared with the processes of the prior art which use catalysts prepared according to processes which do not include the final hydrothermal treatment stage at a temperature of 300 to 1000° C. in the presence of water and possibly at least one halogen, preferably chlorine.

A preferred catalyst of the invention comprises:

a matrix consisting of 0 to 100% by weight of η transition alumina, the remaining weight percent up to 100% of the matrix being that of γ transition alumina, and relative to the catalyst, from 0.001 to 8% by weight of at least one doping metal chosen from the group of alkali and alkaline-earth metals, from 0.10 to 15.0% by weight of at least one halogen chosen from the group comprising fluorine, chlorine, bromine and iodine, from 0.01 to 2.00% by weight of at least one noble metal from the platinum group, from 0.005 to 10% by weight of at least one promoter metal chosen from the group made up of tin, germanium, indium, gallium, thallium, antimony, lead, rhenium, manganese, chromium, molybdenum and tungsten.

Another preferred catalyst of the invention comprises:

a support consisting of a matrix of γ alumina, η alumina, or a mixture of γ alumina and η alumina, of one or several doping metal(s) chosen from the group made up of the alkali and alkaline-earth metals, at least one halogen, a catalytic metal providing the dehydrogenation function of the catalyst, consisting of one or several noble metal(s) from the platinum group, and at least one promoter metal chosen from the metals mentioned above.

According to the invention, the matrix of alumina or aluminas is modified by at least one doping metal chosen from the group made up of the alkali and alkaline-earth metals. The group of alkali and alkaline-earth metals comprises the elements or the group 1a such as lithium, sodium, potassium, rubidium and caesium and those of group 2a such as beryllium, magnesium, calcium, strontium and barium.

According to the invention, the catalyst may comprise one or several of these doping metals and their total content in the catalyst, expressed as weight percent relative to the catalyst, lies between 0.001 and 8% by weight, preferably between 0.005 and 3.0% by weight, and further preferably between 0.01 and 0.3% by weight.

The content of doping metal is chosen in particular in relation to the reactor used to implement the process, the content of doping metal being higher when a mobile bed reactor is used.

Preferably, the doping metal is potassium and/or magnesium.

The halogen or halogens used to acidify the support may represent a total of 0.1 to 15% by weight, preferably from 0.2 to 10% by weight of the catalyst. A single halogen is preferably used, in particular chlorine.

The catalyst also comprises one or several promoter metals whose effect is to promote the dehydrogenating activity of the noble metal from the platinum group and to limit the dispersion loss of the atoms of the noble metal on the surface of the matrix, which is partly responsible for the deactivation of the catalyst.

The promoter metals are chosen in relation to the method of use of the catalyst.

Therefore, when a catalyst is intended for use with a fixed bed process, the promoter metal is preferably chosen from the group consisting of rhenium, manganese, chromium, molybdenum, tungsten, indium and thallium.

When the catalyst is intended for use with a mobile bed process, the promoter, metal is preferably chosen from the group made up of tin, germanium, indium, antimony, lead, thallium and gallium.

Among these, rhenium is also preferred for fixed bed processes and tin for mobile bed processes as they achieve the best promotion of the catalyst activity.

The total content of promoter metal or metals relative to the catalyst is from 0.005 to 10.00% by weight, preferably from 0.01 to 3.00% by weight, and further preferably from 0.01 to 1% by weight.

When the catalyst only contains a single promoter metal, for example rhenium or tin, the weight percentage of the latter is preferably from 0.005 to 0.09%, and better from 0.01 to 0.8% by weight relative to the catalyst.

The catalyst of the invention also comprises at least one noble metal from the platinum group with a content of between 0.01 and 2.00% by weight, preferably from 0.10 to 0.80% by weight.

The noble metals likely to be used are platinum, palladium, iridium; platinum is preferred.

The catalyst of the invention can be prepared by the depositing of its different constituents on the alumina matrix. The depositing of each constituent may be made in whole or in part on one or both of the aluminas of the matrix before or after it is given form. The constituents may be deposited separately or simultaneously in any order.

Therefore, when a mixture of aluminas is used for the matrix, the catalyst constituents can be deposited on both aluminas or on one of them, preferably on the η alumina, before mixing the two aluminas and before they are given form.

It is also possible to deposit in full or in part one or certain constituents on both aluminas or on one of them before they are mixed, and then to make the remaining deposits after mixing the two aluminas, either before or after the mixture is given form. When one or several constituents are deposited before mixing the two aluminas, the doping metal is preferably deposited on the η transition alumina.

However, according to the invention, it is generally preferred to mix the two aluminas before depositing the metal constituents and the halogen or halogens.

Therefore, according to the invention, the catalyst can be prepared by a process which comprises the following stages:

a) preparation, possibly by mixing then giving form to a matrix of γ transition alumina, η transition alumina or a mixture of η transition alumina and γ transition alumina, b) depositing, on at least one of the transition aluminas γ and η, of the following constituents in the weight percentages given below which are relative to the total weight of the catalyst, from 0.001 to 8%, preferably from 0.005 to 3%, or further preferably from 0.01 to 3% by weight of at least one doping metal chosen from the group consisting of the alkali and alkaline-earth metals.

from 0.1 to 15%, preferably from 0.2 to 10% by weight of at least one halogen chosen from the group made up of fluorine, chlorine, bromine and iodine, from 0.01 to 2%, preferably from 0.10 to 0.80% by weight of at least one noble metal from the platinum group, and from 0.005 to 10%, preferably from 0.01 to 3.00% by weight of at least one promoter metal chosen from the group made up of tin, germanium, indium, gallium, thallium, antimony, lead, rhenium, manganese, chromium, molybdenum and tungsten;

it being possible for stages a) and b) to be carried out in any order, but preferably stage a) is performed before stage b) and the deposits of stage b) may be carried out in part only before stage a), it being possible for them to be carried out in any order.

According to a preferred embodiment of this process, first a support is prepared consisting of the alumina matrix and of at least one doping metal, on which is then deposited the promoter metal or metals, the halogen or halogens and the noble metal or metals from the platinum group.

In this case, the doping metal or metals can be deposited on the alumina or mixture of aluminas before or after they are given form.

Preferably the doping metal or metals is or are deposited after the alumina matrix has been given form.

The depositing of the different constituents of the catalyst can be made using conventional methods, in liquid or gas phase, using appropriate precursor compounds. When the deposit is made on the alumina matrix after it has been given form, the methods used may for example be dry impregnation, impregnation by excess solution or ion-exchange. If necessary this operation is followed by drying and roasting at a temperature of between 300 and 900° C., preferably in the presence of oxygen.

The depositing of the doping metal or metals chosen from the group made up of the alkali and alkaline-earth metals, may be carried out using any method, for example dry impregnation, impregnation by excess solution or ion-exchange and may be performed at any stage of the catalyst preparation process. When this deposit is made after the alumina matrix has been given form, preferable use is made of impregnation in an aqueous medium by excess solution, followed by drying to eliminate the impregnation solvent, and roasting under air at a temperature of between 300 and 900° C. for example.

These doping metals may be deposited through the intermediary of compounds such as, for example, the oxides, halides, oxyhalides, nitrates, carbonates, acetates, sulfates, cyanides or the oxalates of said elements. In the case of zirconium, the alcoholates and acetyl acetonates can also be used.

The depositing of the noble metal or metals from the platinum group may also be made using conventional methods, in particular impregnation using a solution, whether aqueous or not, containing a salt or a compound of the noble metal. By way of illustration, among the salts or compounds which can be used, mention can be made of chloroplatinic acid, ammoniated compounds, ammonium chloroplatinate, dicarbonyl platinum dichloride, hexahydroxyplatinic acid, palladium chloride and palladium nitrate.

In the case of platinum, the ammoniated compounds may for example be the hexamine salts of platinum IV with the formula $Pt(NH_3)_6X_4$, the halogenopentamine salts of platinum IV with the formula $(PtX(NH_3)_5)X_3$, the tetrahalogenodiamine salts of platinum with the formula $PtX_4(NH_3)_2X$, the platinum complexes with halogens-polyketones and the halogenated compounds of formula $H(Pt(aca)_2X)$ in which the X element is a halogen chosen from the group made up of chlorine, fluorine, bromine and iodine, and preferably chlorine, and the aca group represents the remainder of the formula $C_5H_7O_2$ derived from acetylacetone. The introduction of the noble metal from the platinum group is preferably made by impregnation using an aqueous or organic solution of one of the organometallic compounds mentioned above. Among the organic solvents that can be used, mention can be made of paraffin, naphthene or aromatic hydrocarbons, and the halogenated organic compounds having for example 1 to 12 carbon atoms per molecule. n-heptane, methylcyclohexane, toluene and chloroform can be given as examples. Solvent mixtures may also be used.

After the introduction of the noble metal, drying and roasting is preferably carried out, for example at a temperature of between 400 and 700° C.

The depositing of the noble metal or metals from the platinum group may be made at any time during the preparation of the catalyst. It may be made alone or simultaneously with the depositing of other constituents, for example of the promoter metal or metals. In this latter case, a solution containing all the constituents to be introduced simultaneously may be used for impregnation.

The depositing of the promoter metal or metals may also be made by conventional methods using precursor compounds such as halides, nitrates, acetates, tartrates, citrates, carbonates and the oxalates of these metals. Any other salt or oxide of these metals which is soluble in water, acids or in another appropriate solvent, is also suitable as a precursor. Examples of such precursors are rhenates, chromates, molybdates and tungstates. The promoter metal or metals can also be introduced by mixing an aqueous solution of their precursor compound or compounds with the alumina or aluminas before the matrix is given form, followed by roasting under air at a temperature of between 400 and 900° C.

The introduction of the promoter metal or metals can also be made using a solution of an organometallic compound of said metals in an organic solvent In this case, this deposit is preferably made after that of the noble metal(s) from the platinum group and roasting of the solid, possibly followed by hydrogen reduction at high temperature, for example between 300 and 500° C. The organometallic compounds are chosen from the group consisting of the complexes of said promoter metal, in particular the polyketonic complexes and the hydrocarbyl metals such as alkyl, cycloalkyl, aryl, alkylaryl and arylalkyl metals. Organohalogenated compounds may also be used. Particular mention can be made of tin tetrabutyl if the promoter metal is tin, lead tetraethyl if the promoter metal is lead and indium triphenyl if the promoter metal is indium. The impregnation solvent may be chosen from the group made up of the paraffin, naphthene or aromatic hydrocarbons containing 6 to 12 carbon atoms per molecule and the halogenated organic compounds containing from 1 to 12 carbon atoms per molecule. Examples which can be given are n-heptane, methylcyclohexane and chloroform. Mixtures of the above-described solvents can also be used.

The halogen, for example chlorine, may be introduced into the catalyst at the same time as another metallic constituent, for example in cases when a halide is used as precursor compound for the metal from the platinum group, for the promoter metal or the alkaline or alkaline-earth metal. This introduction can also be made by impregnation using an aqueous solution containing an acid or a halogenated salt. For example, chlorine may be deposited using a solution of hydrochloric acid. The chlorine may also be introduced by roasting the catalyst at a temperature of between 400 and 900° C. for example, in the presence of an organic compound containing the halogen, such as for example CCl$_4$, CH$_2$Cl$_2$ and CH$_3$Cl.

Evidently at least two constituents of the catalyst may be introduced simultaneously, for example using a solution comprising precursor compounds of the latter. The constituents may also be introduced successively in any order, using separate solutions. In the latter case intermediate drying and/or roasting can be carried out.

The matrix of alumina or mixture of aluminas may be given form using catalyst forming techniques known to men of the art such as for example: extrusion, drop coagulation, pelleting, spray drying or pastille formation.

In preferred manner, the preparation process comprises the following successive stages:

a) giving form to the matrix or γ alumina, or η alumina or a mixture of γ and η alumina, b) depositing on this matrix at least one doping metal chosen from the group made up the alkali and alkaline-earth metals, c) depositing at least one promoter metal chosen from among tin, germanium, indium, gallium, thallium, antimony, lead, rhenium, manganese, chromium, molybdenum and tungsten, d) introduction of at last one element chosen from the group consisting of fluorine, chlorine, bromine and iodine, and e) depositing at least one noble metal from the platinum group.

After shaping the matrix into form and depositing all the constituents, a final heat treatment between 300 and 1000° C. can be carried out which may only comprise one stage preferably at a temperature of between 400 and 900° C., and under oxygen-containing atmosphere, preferably in the presence of free oxygen or air. This treatment generally corresponds to the drying-roasting procedure after the depositing of the final constituent.

It has been seen that, according to the invention, after giving form to the matrix and depositing all the constituents, an additional heat treatment is carried out which may be made at a temperature of between 300 and 1000° C., preferably between 400 and 700° C., in a gaseous atmosphere containing steam and possibly a halogen such as chlorine.

This treatment may be conducted in a bed crossed by a flow of gas or in a static atmosphere. The gaseous atmosphere preferably contains water and possibly at least one halogen. The molar water content lies between 0.05 and 100%, preferably between 1 and 50%. The molar halogen content lies between 0 and 20%, preferably between 0 and 10%, and further preferably between 0 and 2%. The duration of this treatment is variable depending upon temperature conditions, partial water pressure and amount of catalyst. This value lies advantageously between one minute and 30 hours, preferably between 1 and 10 hours. The gaseous atmosphere used has for example an air, oxygen or inert as base such as argon or nitrogen.

After being prepared according to the invention, the roasted catalyst may advantageously be subjected to activation treatment under hydrogen at high temperature, for example between 300 and 550° C. The procedure for treatment under hydrogen consists of, for example, a slow rise in temperature under a flow of hydrogen until the maximum reduction temperature is reached, which generally lies between 300 and 550° C., preferably between 350 and 450° C., followed by the maintaining of this temperature for a period which generally ranges from 1 to 6 hours.

According to the invention, the above-described catalyst is used for the conversion of hydrocarbons, and more particularly for gasoline reforming processes and the production of aromatics.

Reforming processes bring an increase in the octane number of gasoline fractions from the distillation of crude oil and/or other refining processes.

Production processes of aromatics supply the bases (benzene, toluene and xylene) for use in petrochemistry. These processes offer additional interest by contributing to the Production of substantial quantities of hydrogen which is indispensable for refinery hydrotreatment processes.

These two processes differ in the choice of operating conditions and load composition.

The typical load treated by these processes contains paraffin, naphthene and aromatic hydrocarbons containing from 5 to 12 carbon atoms per molecule. This load is determined, among others, by its density and weight composition.

To implement these processes, the hydrocarbon load is placed in contact with the catalyst of the present invention under appropriate conditions, for example at a temperature of between 400 and 700° C., under pressure ranging from atmospheric pressure to 4 MPa, using the mobile bed or fixed bed method.

Generally, this contact is made with a mass flow of load treated per mass unit of the catalyst and per hour ranging from 0.1 to 10 kg/kg.h. Operating pressure may be set between atmosphere pressure and 4 MPa. When a fixed bed is used, the pressure lies between 1 to 2 MPa, and when a mobile bed is used the pressure is preferably set at 0.1 to 0.9 MPa.

Part of the hydrogen produced is recycled according to a molar recycling rate ranging from 0.1 to 8. The rate is the ratio of flow of recycled hydrogen over load flow.

Other characteristics and advantages of the invention will be more clearly understood on reading the following examples, which are evidently given by way of illustration and are not restrictive.

The invention shall now be described in the following examples of embodiment given as an illustrative and not a restrictive guide.

EXAMPLE 1

Preparation of a catalyst according to the invention comprising a matrix made up of a mixture of γ alumina and η alumina on which potassium, platinum, rhenium and chlorine are deposited a) forming the alumina matrix The matrix is prepared by mechanically mixing a powder of γ alumina having a specific surface area of 200 m$^2$/g with a powder of η alumina having a specific surface area of 320 m$^2$/g previously prepared by roasting bayerite. The proportion of η alumina is 30% by weight. The mixture is then given form by extrusion. The extruded matrix is roasted under a flow of dry air at 520° C. for 3 hours.

b) depositing of potassium

After cooling, the matrix obtained in stage a) is placed in contact with an aqueous solution of potassium carbonate K$_2$CO$_3$. The concentration of this solution is 12.8 g of potassium per liter. This contact is made at room temperature for 1 h. The impregnated extrudates are then dried at 120° C. for 15 h and roasted at 530° C. under a flow of dry air for 20 h.

c)d)e) depositing of platinum, rhenium and chlorine

Platinum, rhenium and chlorine are deposited on part of the support obtained in stage b).

The platinum is deposited during an initial impregnation of the support using an aqueous solution containing per liter:
8.20 g of chlorine in HCl form,
1.00 g of platinum in $H_2PtCl_6$ form.

The solution is left in contact with the support for 2 h. After draining and drying for 4 h at 120° C., the impregnated support is roasted a 530° C. for 3 h under a flow of dry air. The rhenium is then deposited by a second impregnation with an aqueous solution containing per liter:
4.20 g of chlorine in HCl form,
1.50 g of rhenium in $ReCl_3$ form.

After drying, the impregnated support is roasted at 530° C. for 2 h under a flow of dry air.

f) heat treatment in the presence of water and chlorine

The product obtained after stages c) d) e) above is treated at 510° C. for 2 h under a low of 2000 $dm^3$/h of air per 1 kg of solid. This air contains water and chlorine injected into a preheating area located above the bed of the solid. The molar concentrations of water and chlorine are respectively 1% and 0.05%.

EXAMPLE 2

Preparation of a catalyst according to the invention comprising a matrix of γ alumina and η alumina on which are deposited magnesium, platinum, rhenium and chlorine a) forming the matrix The alumina matrix is prepared in the same manner as in example 1, stage a) by mechanically mixing a powder of γ alumina and a powder of η alumina, extrusion and roasting.

b) depositing of magnesium

The matrix obtained in stage a) is placed in contact with an aqueous solution of hexahydrated magnesium nitrate $Mg(NO_3)_2,6H_2O$. The concentration of this solution is 8.0 g of magnesium per liter. This contact is made at room temperature for 2 h. The extrudates are then dried at 120° C. for 15 h and roasted at 530° C. under a flow of dry air for 2 h.

c)d)e) depositing of platinum, rhenium and chlorine

Platinum, rhenium and chlorine are deposited on the product obtained in stage b) above in exactly the same manner as in example 1 stage c).

f) heat treatment in the presence of water and chlorine

The product obtained subsequent to stages c)d)e) above is treated in exactly the same manner as in example 2

EXAMPLE 3 (COMPARATIVE)

In this example, much the same operating method is followed as in Example 1, but in stage a) only γ alumina is used, no potassium or magnesium are deposited, and no final hydrothermal treatment is carried out.

a) forming the matrix

The matrix is prepared by extruding a powder of γ alumina whose specific surface area is 220 $m^2$/g. The extruded matrix is then roasted in a flow of dry air at 520° C. for 3 h.

b) depositing of platinum, rhenium and chlorine

Platinum, rhenium and chlorine are deposited on the matrix obtained subsequent to stage a) above in exactly the same manner as in stages c)d)e) of examples 1) and 2).

The characteristics of the catalysts thus prepared are grouped together under table I below.

TABLE I

| Catalyst | proportion η alumina (weight %) | platinum content (wt %) | rhenium content (w %) | chlorine content (w %) | potassium content (wt %) | magnesium content (wt %) | specific surf. area ($m^2$/g) |
|---|---|---|---|---|---|---|---|
| Ex. 3 | 0 | 0.23 | 0.25 | 1.12 | 0 | 0 | 216 |
| Ex. 1 | 30 | 0.24 | 0.26 | 1.16 | 0.071 | 0 | 245 |
| Ex. 2 | 30 | 0.21 | 0.22 | 1.11 | 0 | 0.032 | 243 |

EXAMPLE 4

Performance of catalysts:

The catalysts prepared above in examples 1, 2 and 3 were tested by converting a load with the following characteristics:

| | |
|---|---|
| volume mass at 20° C. | 0.742 kg/$dm^3$ |
| research octane number | ≈41 |
| paraffin content | 52.2 wt % |
| naphthene content | 32.4 wt % |
| aromatic content | 15.4 wt % |

The following operating conditions were used:

| | |
|---|---|
| temperature | 485° C. |
| total pressure | 1.5 MPa |
| mass flow of load (en kg · $h^{-1}$) per kilogram of catalyst | 1.5 $h^{-1}$ |

Catalyst performances are given in Table II below, and are expressed as weight yield and the research octane number of the reformed product.

TABLE II

| Catalyst | yield reformed product (wt %) | hydrogen yield (weight %) | aromatic yield (weight %) | C4 yield (weight %) | C4/aromatics |
|---|---|---|---|---|---|
| Example 3 | 85.3 | 3.0 | 59.3 | 11.7 | 0.20 |
| Example 1 | 86.1 | 3.2 | 59.9 | 10.7 | 0.18 |
| Example 2 | 86.8 | 3.3 | 59.7 | 9.9 | 0.17 |

If the performances of the catalysts in examples 1 and 3 are compared and those of the catalysts in examples 2 and 3 are compared, it is found that the performances of the catalysts in examples 1 and 2 used in a process according to the invention show a distinct improvement compared with the catalyst in example 3 which represents the prior art.

The yields of light products from C4 cracking obtained during the testing of the two catalysts in examples 1 and 2 according to the invention are very significantly lower than those observed with the comparative catalyst in example 3.

It can be seen that the ratio of the yields of C4 cracking products over the yields of aromatic compounds, called C4/aromatics in the above table, is lower for the two catalysts of examples 1 and 2 used in a process according to the invention. The selectivity of the catalysts for the desired aromatic products will increase the more this ratio decreases.

The catalysts of examples 1 and 2 used in a process according to the invention, which compared with the comparative catalyst of example 3 also contain η alumina, potassium and magnesium respectively, and which have been advantageously subjected to heat treatment in the presence of water and chlorine, offer improved characteristics compared with the comparative catalyst of example 3, in particular lower selectivity for cracking products, and therefore improved selectivity for aromatic products.

We claim:

1. A process for the conversion of a hydrocarbon load containing paraffin, naphthene and aromatic hydrocarbons having 5 to 12 carbon atoms into aromatic compounds, comprising contacting said load with a catalyst under temperature and pressure conditions to produce said aromatic compounds, wherein the catalyst comprises:

a matrix consisting of 0 to 100% by weight of η transition alumina, the remaining weight percentage of the matrix, up to 100%, consisting of γ transition alumina, and at least one doping metal selected from the group consisting of alkali metals and alkaline-earth metals, at least one halogen selected from the group consisting of fluorine, chlorine, bromine and iodine, and at least one noble metal selected from the platinum group, and at least one promoter metal selected from the group consisting of tin, germanium, indium, gallium, thallium, antimony, lead, rhenium, manganese, chromium, molybdenum and tungsten, said catalyst having previously been hydrothermally treated at a temperature of 300 to 1,000° C. in a gaseous atmosphere containing steam, said atmosphere also comprising chlorine in a molar content of greater than 0 but no more than 20%.

2. The process of claim 1, wherein the matrix contains from 3 to 70% by weight of the η transition alumina.

3. The process of claim 1, wherein the catalyst comprises, expressed as a weight percentage relative to the catalyst:

from 0.001 to 8% of at least one doping metal selected from the group consisting of the alkaline metal and alkaline-earth metals, from 0.10 to 15% of at least one halogen selected from the group consisting of fluorine, chlorine, bromine and iodine, from 0.01 to 2% of at least one noble metal selected from the platinum group, and from 0.005 to 10.00% of at least one promoter metal selected from the group consisting of tin, germanium, indium, gallium, thallium, antimony, lead, rhenium, manganese, chromium, molybdenum and tungsten.

4. The process of claim 1, wherein the halogen content of the catalyst is between 0.2 and 10% by weight.

5. The process of claim 1, wherein the halogen is chlorine.

6. The process of claim 1, wherein the total noble metal content of the catalyst is from 0.1 to 0.8% by weight.

7. The process of claim 1, wherein the noble metal is platinum.

8. The process of claim 1, wherein the promoter metal is selected from the group consisting of tin, germanium, indium, antimony, lead, thallium and gallium.

9. The process of claim 8, wherein the promoter metal is tin.

10. The process of claim 1, wherein the promoter metal is selected from the group consisting of rhenium, manganese, chromium, molybdenum, tungsten, indium and thallium.

11. The process of claim 10, wherein the promoter metal is rhenium.

12. The process of claim 1, wherein the doping metal is potassium or magnesium or a mixture thereof.

13. The process of claim 1, wherein said hydrothermal treatment is conducted at a temperature of 400 to 700° C.

14. The process of claim 1, wherein the hydrothermal treatment is conducted for a period of one minute to 30 hours.

15. The process of claim 14, wherein the hydrothermal treatment is conducted for a period of 1 to 10 hours.

16. The process of claim 1, wherein said hydrothermal treatment is conducted in a gaseous atmosphere having a water molar content of greater than 0.05%.

17. The process of claim 1, wherein said load is contacted with the catalyst at a temperature of 400 to 700° C. under a pressure ranging from atmospheric pressure to 4 MPa.

18. The process of claim 10, which is conducted in a fixed bed at a pressure of 1 to 2 MPa.

19. The process of claim 8, which is conducted in a mobile bed at a pressure of 0.1 to 0.9 MPa.

20. The process of claim 17, wherein the composition is contacted with the catalyst under a mass flow of load ranging from 0.1 to 10 kg of load per kg of catalyst per hour.

21. The process of claim 1, wherein the conversion of the hydrocarbons to the aromatic compounds is a reforming operation.

* * * * *